US012632017B2

(12) United States Patent
Wijffels et al.

(10) Patent No.: US 12,632,017 B2
(45) Date of Patent: May 19, 2026

(54) CASCADE CONTROLLER CALIBRATION

(71) Applicants:Ford Global Technologies, LLC, Dearborn, MI (US); THE REGENTS OF THE UNIVERSITY OF MICHIGAN, Ann Arbor, MI (US)

(72) Inventors: Lodewijk Wijffels, Northville, MI (US); Joshua Guerra, Farmington Hills, MI (US); Taehyun Shim, Ann Arbor, MI (US); Yijun Li, Dearborn, MI (US)

(73) Assignees: Ford Global Technologies, LLC, Dearborn, MI (US); The Regents of the University of Michigan, Ann Arbor, MI (US)

( * ) Notice: Subject to any disclaimer, the term of this patent is extended or adjusted under 35 U.S.C. 154(b) by 1121 days.

(21) Appl. No.: 17/675,149

(22) Filed: Feb. 18, 2022

(65) Prior Publication Data

US 2023/0266724 A1 Aug. 24, 2023

(51) Int. Cl.
G05B 13/04 (2006.01)

(52) U.S. Cl.
CPC .................................. G05B 13/042 (2013.01)

(58) Field of Classification Search
None
See application file for complete search history.

(56) References Cited

U.S. PATENT DOCUMENTS

| | | | |
|---|---|---|---|
| 6,055,524 A | 4/2000 | Cheng | |
| 6,310,626 B1 * | 10/2001 | Walker | H04N 1/6033 |
| | | | 703/2 |
| 6,697,767 B2 | 2/2004 | Wang et al. | |
| 2004/0024504 A1 * | 2/2004 | Salib | B62D 7/159 |
| | | | 701/38 |
| 2017/0068252 A1 * | 3/2017 | Yu | G05D 1/0858 |
| 2017/0115641 A1 * | 4/2017 | Li | G05B 11/36 |
| 2017/0239892 A1 * | 8/2017 | Buller | B28B 17/0081 |
| 2018/0186403 A1 | 7/2018 | Zhu et al. | |

FOREIGN PATENT DOCUMENTS

TW          201500875 A  *  1/2015

OTHER PUBLICATIONS

Rojjananil, K., et al., "Optimized PIDI2D2 controller based on genetic algorithm for three-tank liquid level control System," Science Direct, Procedia Computer Science 86, 2016, pp. 100-103.

* cited by examiner

*Primary Examiner* — Thomas C Lee
*Assistant Examiner* — Anzuman Sharmin
(74) *Attorney, Agent, or Firm* — Frank A. MacKenzie; Brooks Kushman P.C.

(57) ABSTRACT

Upon determining calibration parameters for a single-loop controller that minimize a difference between an input to the single-loop controller and a response from the single-loop controller, calibration parameters for a cascade controller are determined based on the determined calibration parameters for the single-loop controller. The cascade controller includes a secondary controller and a primary controller. The calibration parameters for the cascade controller are provided to a second computer in a vehicle.

20 Claims, 7 Drawing Sheets

300

210 ——————
220 ------

400

| 210 | ———— |
| 225 | — — — |
| 220 | ···· ··· ··· ··· |

CASCADE CONTROLLER CALIBRATION

BACKGROUND

One or more computers can be programmed to control operation of a machine, e.g., a vehicle. For example, the computer can provide a control input to a controller that is programmed to actuate a machine component to achieve the control input. The controller may control actuation of the machine component based on calibration parameter(s). Actuation of the machine component can be supported by maintaining and/or adjusting calibration parameters, which allows operation of the machine to be carried out as intended.

DETAILED DESCRIPTION

Figure 1:
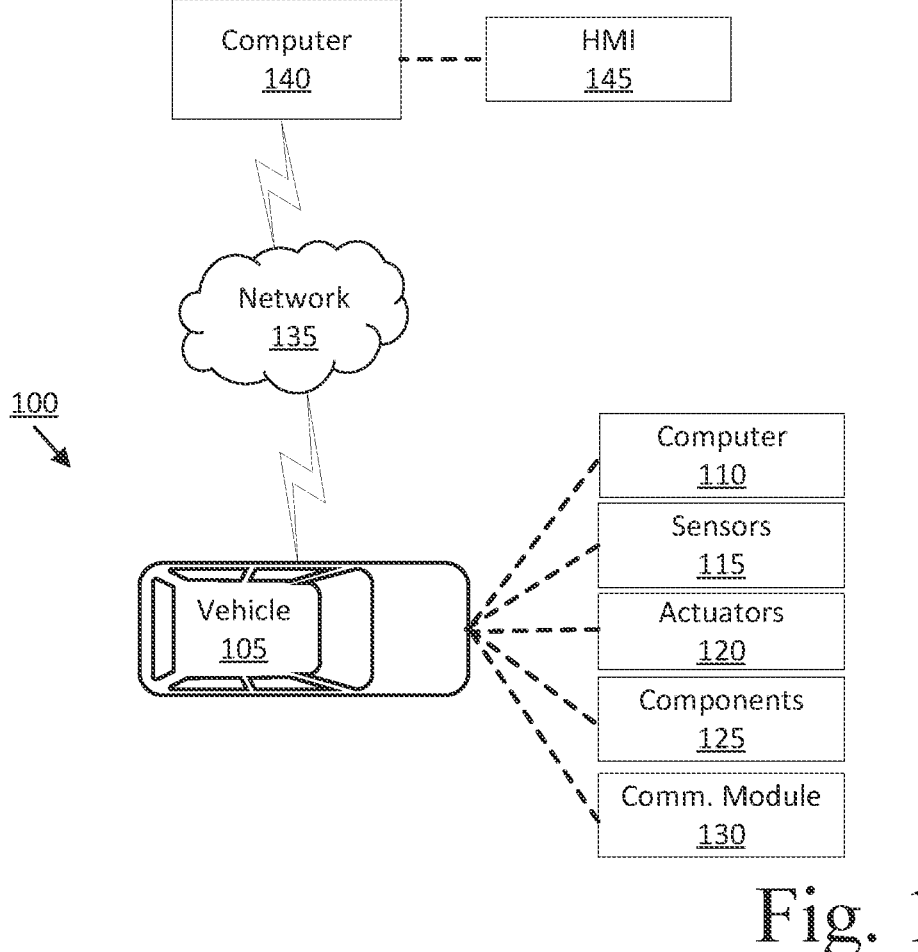
FIG. 1 is a block diagram of an example control system for a vehicle.

A cascade controller in a machine, e.g., a vehicle, robot, etc., may be programmed to actuate a machine component to achieve an expected control input for systems including vehicle guidance, robot operation, etc. Vehicle guidance can include operation of vehicles in autonomous or semi-autonomous modes. Robot guidance can include guiding a robot end effector, for example a gripper, to pick up a part and orient the part for assembly.

Vehicle guidance will be described herein as a non-limiting example of using a cascade controller to actuate a machine component, i.e., a vehicle component in the described examples, to achieve an expected control input. A cascade controller may be advantageous, e.g., as opposed to a single-loop controller, in the above systems as disturbances in intermediate or secondary processes, e.g., hitting a pothole, may directly affect the primary process, e.g., actuating a steering component. The cascade controller can limit the effect of the disturbances on the primary process as compared to a single-loop controller. For example, a cascade controller in a vehicle can be programmed to receive an expected control input and to actuate a vehicle component to achieve the expected control input. The cascade controller includes calibration parameters, which can be adjusted to achieve the expected control input. However, adjusting calibration parameters for a cascade controller can be complex and expensive because some of the calibration parameters for the cascade controller are dependent upon other calibration parameters for the cascade controller. That is, adjusting one calibration parameter can have an unexpected effect on the other controller thereby outputting a response that differs, e.g., in an unexpected way, from the expected control input.

Adjusting calibration parameters for a single-loop controller can be less complex and less expensive than adjusting calibration parameters for the cascade controller because the calibration parameters for the single-loop controller are independent of each other. While a particular set of calibration parameters for a cascade controller corresponds to a particular set of calibration parameters for a single-loop controller, a particular set of calibration parameters for the single-loop controller corresponds to a plurality of sets of calibration parameters for the cascade controller. Techniques described herein reduce deviation between an expected control input and a response from a cascade controller by using a relationship between types of cascade controllers and single-loop controllers to determine calibration parameters for the cascade controller based on calibration parameters for a corresponding type of single-loop controller.

A system includes a computer including a processor and a memory, the memory storing instructions executable by the processor to, upon determining calibration parameters for a single-loop controller that minimize a difference between an input to the single-loop controller and a response from the single-loop controller, determine calibration parameters for a cascade controller based on the determined calibration parameters for the single-loop controller. The cascade controller includes a primary controller and a secondary controller. The instructions further include instructions to provide the calibration parameters for the cascade controller to a second computer in a vehicle.

The instructions can further include instructions to select a type of one of the single-loop controller or the cascade controller based on a type of the other of the single-loop controller or the cascade controller. The type of the cascade controller may be defined by a type of the primary controller and a type of the secondary controller.

The type of the single-loop controller may be a proportional-integral-derivative-double integral-double derivative controller. The type of primary controller may be one of a proportional-integral-derivative (PID) controller or a proportional-integral (PI) controller, and the type of the secondary controller may be a PID controller The type of the single-loop controller may be a proportional-integral-derivative-double derivative controller. The type of the primary controller may be one of a PID controller or a PI controller, and the type of the secondary controller may be the proportional-derivative (PD) controller.

The type of the single-loop controller may be a proportional-integral-derivative-double derivative controller. The type of the primary controller may be one of a PD controller or a proportional (P) controller, and the type of the secondary controller may be the PID controller.

The type of the single-loop controller may be a proportional-integral-derivative-double integral controller. The type of the primary controller may be one of a PID controller or a PI controller, and the type of the secondary controller may be a PI controller The type of the single-loop controller may be a PID controller. The type of the primary controller may be one of a PID controller or a PI controller, and the type of the secondary controller may be a P controller.

The type of the single-loop controller may be a PID controller. The type of the primary controller may be one of a PD controller or a P controller, and the type of the secondary controller may be a PI controller.

The type of the single-loop controller may be a proportional-derivative-double derivative controller. The type of the primary controller may be one of a PD controller or a P controller, and the type of the secondary controller may be a PD controller.

The system can include the second computer including a second processor and a second memory storing instructions such that the second computer is programmed to actuate a vehicle component based on the calibration parameters for the cascade controller.

The instructions can further include instructions to determine the calibration parameters for the single-loop controller based on one of a) a user input specifying the calibration parameters, or b) simulation data.

A method includes, upon determining calibration parameters for a single-loop controller that minimize a difference between an input to the single-loop controller and a response from the single-loop controller, determining calibration parameters for a cascade controller based on the determined calibration parameters for the single-loop controller. The cascade controller includes a secondary controller and a primary controller. The method further includes providing the calibration parameters for the cascade controller to a second computer in a vehicle.

The method can further include selecting a type of one of the single-loop controller or the cascade controller based on a type of the other of the single-loop controller or the cascade controller. The type of the cascade controller may be defined by a type of the primary controller and a type of the secondary controller.

The type of the single-loop controller may be a proportional-integral-derivative-double integral-double derivative controller. The type of primary controller may be one of a proportional-integral-derivative (PID) controller or a proportional-integral (PI) controller, and the type of the secondary controller may be a PID controller The type of the single-loop controller may be a proportional-integral-derivative-double derivative controller. The type of the primary controller may be one of a PID controller or a PI controller, and the type of the secondary controller may be the proportional-derivative (PD) controller.

The type of the single-loop controller may be a proportional-integral-derivative-double derivative controller. The type of the primary controller may be one of a PD controller or a proportional (P) controller, and the type of the secondary controller may be the PID controller.

The type of the single-loop controller may be a proportional-integral-derivative-double integral controller. The type of the primary controller may be one of a PID controller or a PI controller, and the type of the secondary controller may be a PI controller The type of the single-loop controller may be a PID controller. The type of the primary controller may be one of a PID controller or a PI controller, and the type of the secondary controller may be a P controller.

The type of the single-loop controller may be a PID controller. The type of the primary controller may be one of a PD controller or a P controller, and the type of the secondary controller may be a PI controller.

The type of the single-loop controller may be a proportional-derivative-double derivative controller. The type of the primary controller may be one of a PD controller or a P controller, and the type of the secondary controller may be a PD controller.

Further disclosed herein is a computing device programmed to execute any of the above method steps. Yet further disclosed herein is a computer program product, including a computer readable medium storing instructions executable by a computer processor, to execute an of the above method steps.

With reference to FIGS. 1-5, an example control system 100 includes a vehicle 105 and a remote computer 140. A vehicle computer 110 in the vehicle 105 receives data from sensors 115. The vehicle computer 110 is programmed to operate the vehicle 105 using calibration parameters, received from the remote computer 140, for a cascade controller 200. To determine the calibration parameters for the cascade controller 200, the remote computer 140 is programmed to, upon determining calibration parameters for a single-loop controller 500 that minimize a difference between an expected control input 510 to the single-loop controller 500 and a response 520 from the single-loop controller 500, determine calibration parameters for the cascade controller 200 based on the determined calibration parameters for the single-loop controller 500. The cascade controller 200 includes a primary controller 205a and a secondary controller 205b (as described further below). The remote computer 140 is further programmed to provide the calibration parameters for the cascade controller 200 to the vehicle computer 110, and the cascade controller 200 can then operate a vehicle component (or components) 125 more efficiently.

Turning now to FIG. 1, the vehicle 105 includes the vehicle computer 110, sensors 115, actuators 120 to actuate various vehicle components 125, and a vehicle communications module 130. The communications module 130 allows the vehicle computer 110 to communicate with a remote computer 140, and/or other vehicles, e.g., via a messaging or broadcast protocol such as Dedicated Short Range Communications (DSRC), cellular, and/or other protocol that can support vehicle-to-vehicle, vehicle-to infrastructure, vehicle-to-cloud communications, or the like, and/or via a packet network 135.

The vehicle computer 110 includes a processor and a memory such as are known. The memory includes one or more forms of computer-readable media, and stores instructions executable by the vehicle computer 110 for performing various operations, including as disclosed herein. The vehicle computer 110 can further include two or more computing devices operating in concert to carry out vehicle operations including as described herein. Further, the vehicle computer 110 can be a generic computer with a processor and memory as described above, and/or may include an electronic control unit (ECU) or electronic controller or the like for a specific function or set of functions, and/or may include a dedicated electronic circuit including an ASIC that is manufactured for a particular operation, e.g., an ASIC for processing sensor data and/or communicating the sensor 115 data. In another example, the vehicle computer 110 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. In some examples, a combination of processor(s), ASIC(s), and/or FPGA circuits may be included in the vehicle computer 110.

The vehicle computer 110 may operate and/or monitor the vehicle 105 in an autonomous mode, a semi-autonomous mode, or a non-autonomous (or manual) mode, i.e., can control and/or monitor operation of the vehicle 105, including controlling and/or monitoring components 125. For purposes of this disclosure, an autonomous mode is defined as one in which each of vehicle 105 propulsion, braking, and steering are controlled by the vehicle computer 110; in a semi-autonomous mode the vehicle computer 110 controls one or two of vehicle 105 propulsion, braking, and steering; in a non-autonomous mode a human operator controls each of vehicle 105 propulsion, braking, and steering.

The vehicle computer 110 may include programming to operate one or more of vehicle 105 brakes, propulsion (e.g., control of acceleration in the vehicle 105 by controlling one or more of an internal combustion engine, electric motor, hybrid engine, etc.), steering, transmission, climate control, interior and/or exterior lights, horn, doors, etc., as well as to determine whether and when the vehicle computer 110, as opposed to a human operator, is to control such operations.

The vehicle computer 110 may include or be communicatively coupled to, e.g., via a vehicle communications network such as a communications bus as described further below, more than one processor, e.g., included in electronic controller units (ECUs) or the like included in the vehicle 105 for monitoring and/or controlling various vehicle components 125, e.g., a transmission controller, a brake controller, a steering controller, etc. A controller 205 in the context of this disclosure is discussed below regarding FIG. 2. The vehicle computer 110 is generally arranged for communications on a vehicle communication network that can include a bus in the vehicle 105 such as a controller area network (CAN) or the like, and/or other wired and/or wireless mechanisms.

Via the vehicle 105 network, the vehicle computer 110 may transmit messages to various devices in the vehicle 105 and/or receive messages (e.g., CAN messages) from the various devices, e.g., sensors 115, actuators 120, ECUs, etc. Alternatively, or additionally, in cases where the vehicle computer 110 actually comprises a plurality of devices, the vehicle communication network may be used for communications between devices represented as the vehicle computer 110 in this disclosure. Further, as mentioned below, various controllers and/or sensors 115 may provide data to the vehicle computer 110 via the vehicle communication network.

Vehicle 105 sensors 115 may include a variety of devices such as are known, e.g., Light Detection And Ranging (LIDAR) sensor(s) 115, radar sensors 115, camera sensors 115, etc. to provide data to the vehicle computer 110.

The vehicle 105 actuators 120 are implemented via circuits, chips, or other electronic and or mechanical components that can actuate various vehicle 105 subsystems in accordance with appropriate control signals as is known. The actuators 120 may be used to control components 125, including braking, acceleration, and steering of a vehicle 105.

In the context of the present disclosure, a vehicle component 125 is one or more hardware components adapted to perform a mechanical or electro-mechanical function or operation-such as moving the vehicle 105, slowing or stopping the vehicle 105, steering the vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a suspension component (e.g., that may include one or more of a damper, e.g., a shock or a strut, a bushing, a spring, a control arm, a ball joint, a linkage, etc.), a brake component, a park assist component, an adaptive cruise control component, an adaptive steering component, one or more passive restraint systems (e.g., airbags), a movable seat, etc.

In addition, the vehicle computer 110 may be configured for communicating via a vehicle-to-vehicle communications module 130 or interface with devices outside of the vehicle, e.g., through a vehicle-to-vehicle (V2V) or vehicle-to-infrastructure (V2X) wireless communications (cellular and/or short-range radio communications, etc.) to another vehicle, and/or to a remote computer 140 (typically via direct radio frequency communications). The communications module 130 could include one or more mechanisms, such as a transceiver, by which the computers of vehicles may communicate, including any desired combination of wireless (e.g., cellular, wireless, satellite, microwave, and radio frequency) communication mechanisms and any desired network topology (or topologies when a plurality of communication mechanisms are utilized). Exemplary communications provided via the communications module include cellular, Bluetooth, IEEE 802.11, dedicated short range communications (DSRC), cellular V2X (CV2X), and/or wide area networks (WAN), including the Internet, providing data communication services. For convenience, the label "V2X" is used herein for communications that may be vehicle-to-vehicle (V2V) and/or vehicle-to-infrastructure (V2I), and that may be provided by the communications module 130 according to any suitable short-range communications mechanism, e.g., DSRC, cellular, or the like.

The network 135 represents one or more mechanisms by which a vehicle computer 110 may communicate with remote computing devices, e.g., the remote computer 140, another vehicle computer, etc. Accordingly, the network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks 135 include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

The remote computer 140 can be a conventional computing device, i.e., including one or more processors and one or more memories, programmed to provide operations such as disclosed herein. Further, the remote computer 140 can be accessed via the network 135, e.g., the Internet, a cellular network, and/or or some other wide area network.

The remote computer 140 can include a human-machine interface (HMI) 145. The HMI 145 includes user input devices such as knobs, buttons, switches, pedals, levers, touchscreens, and/or microphones, etc. The input devices may include sensors to detect user inputs and provide user input data to the remote computer 140. That is, the remote computer 140 may be programmed to receive user input from the HMI 145. The user may provide each user input via the HMI 145, e.g., by selecting a virtual button on a touchscreen display, by providing voice commands, etc. For example, a touchscreen display included in an HMI 145 may include sensors to detect that a user selected a virtual button on the touchscreen display to, e.g., select or deselect an operation, which input can be received in the remote computer 140 and used to determine the selection of the user input.

The HMI 145 typically further includes output devices such as displays (including touchscreen displays), speakers, and/or lights, etc., that output signals or data to the user. The HMI 145 can send and/or receive messages to/from the remote computer 140.

The vehicle computer 110 can receive sensor 115 data of the environment around the vehicle 105. The vehicle computer 110 can be programmed to operate the vehicle 105 based on the sensor 115 data. For example, the vehicle computer 110 can generate a path along which to operate the vehicle 105, e.g., to avoid one or more objects around the vehicle 105.

As used herein, a "path" is a set of points, e.g., that can be specified as coordinates with respect to a vehicle coordinate system and/or geo-coordinates, that the vehicle computer 110 is programmed to determine with a conventional navigation and/or path planning algorithm. A path can be specified according to one or more path polynomials. A path polynomial is a polynomial function of degree three or less that describes the motion of a vehicle on a ground surface. Motion of a vehicle on a roadway is described by a multi-dimensional state vector that includes vehicle location, orientation, speed, and acceleration. Specifically, the vehicle motion vector can include positions in x, y, z, yaw, pitch, roll, yaw rate, pitch rate, roll rate, heading velocity and heading acceleration that can be determined by fitting a polynomial function to successive 2D locations included in the vehicle motion vector with respect to the ground surface, for example.

Further for example, the path polynomial p(x) is a model that predicts the path as a line traced by a polynomial equation. The path polynomial p(x) predicts the path for a predetermined upcoming distance x, by determining a lateral coordinate p, e.g., measured in meters:

$$p(x)=a_0+a_1x+a_2x^2+a_3x^3 \qquad (1)$$

where $a_0$ an offset, i.e., a lateral distance between the path and a center line of the host vehicle 105 at the upcoming distance x, $a_1$ is a heading angle of the path, $a_2$ is the curvature of the path, and $a_3$ is the curvature rate of the path.

Upon generating the path, the vehicle computer 110 can actuate one or more vehicle components 125 to operate the vehicle 105 along the path. For example, the vehicle 105 can include one or more cascade controllers 200 (as discussed below regarding FIG. 2). The vehicle computer 110 can be programmed to provide expected control inputs 210 (as discussed below regarding FIG. 2) to respective cascade controller 200. A cascade controller 200 can be programmed to actuate a corresponding vehicle component 125, e.g., a steering component, a propulsion component, a braking component, etc., to achieve the expected control input 210. The vehicle computer 110 can determine a response 220 (as discussed below regarding FIG. 2) resulting from the expected control input 210. The vehicle computer 110 can then provide the response 220 to the remote computer 140. For example, the vehicle computer 110 can transmit the response 220 to the remote computer 140, e.g., via network 135.

Figure 2:
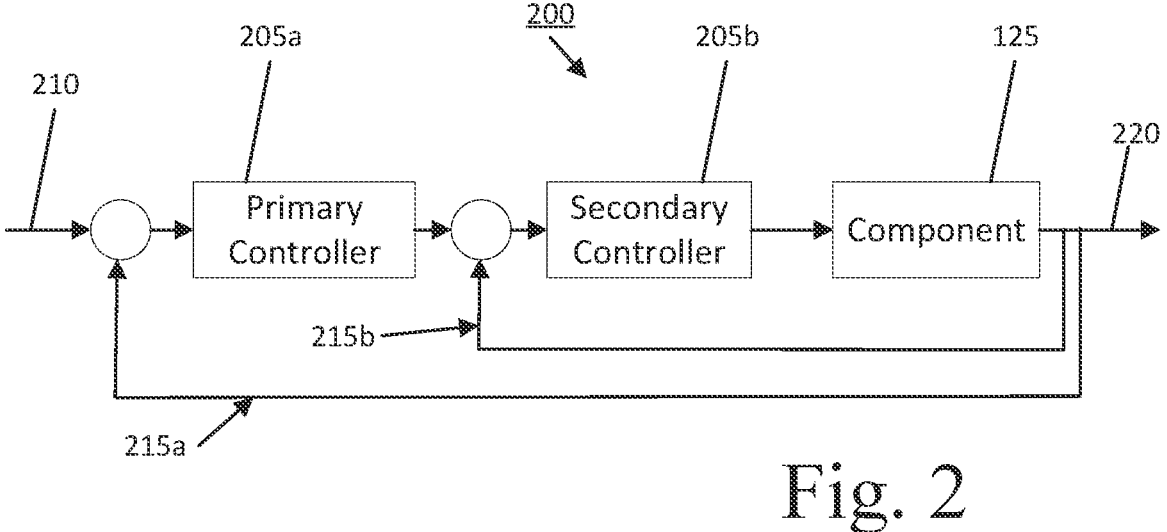
FIG. 2 is a block diagram of an example cascade controller.

With reference to FIG. 2, a cascade controller 200 includes two controllers 205 arranged in a series such that the output of one controller, i.e., a primary controller 205a, is provided as an input to the other controller, i.e., a secondary controller 205b. As used herein, a "controller" is a computing device including a processor and a memory that can store instructions executable by the processor to control operation of a vehicle component 125 based on an expected control input 210. The two controllers 205 of the cascade controller 200, in the context of this disclosure, are programmed according to a proportional-integral-derivative (PID) control strategy. A control strategy in the present context includes a mathematical technique to determine an actuation of a vehicle component 125 to follow an expected control input 210. The PID control strategy includes proportional (P), integral (I), and derivative (D) calibration parameters. The calibration parameters are numerical values, e.g., integers, that provide corrections for a control function to minimize a difference between an expected control input 210 and a response 220.

In a cascade controller 200, the primary controller 205a receives the expected control input 210, and the secondary controller 205b outputs the response 220. A cascade controller 200 includes an inner feedback loop 215b and an outer feedback loop 215a. The outer feedback loop 215a provides feedback to the primary controller 205a, and the inner feedback loop 215b provides feedback to the secondary controller 205b. The inner and outer feedback loops 215a, 215b provide feedback to the respective controllers 205 to adjust the respective outputs, which allows the cascade controller 200 to minimize a difference between the expected control input 210 and the response 220.

A type of a controller 205 indicates the calibration parameters for the controller 205 that have a non-zero value. The primary and secondary controllers 205a, 205b may be a same or different type of controller 205. That is, the primary controller 205a and the secondary controller 205b may include same or different non-zero calibration parameters. It is to be understood that while the controllers 205 of a cascade controller 200 may be of a same type, i.e., have the same non-zero value calibration parameters, the non-zero values of the respective calibrations parameters may be different between the two controllers 205. Non-limiting examples of types of controllers for a PID control strategy include a P controller, a PI controller, a PD controller, a PID controller, etc.

A control input 210 (or reference input, stimuli, reference value, etc.), in the present context, is a set of data describing physical parameters of the vehicle 105 over time. A physical parameter is a measurement of a physical phenomenon related to vehicle 105 operation, e.g., a speed, heading (i.e., direction of travel), location, temperature, pressure, etc. A control input 210 thus includes data describing a change of one or more physical parameters versus time. A control input 210 may include any combination of gradual changes, e.g., a curve, and/or a discontinuous or abrupt change, e.g., a step pulse, of a physical parameter. A control input 210 may include changes of one or more physical parameters over time, e.g., describing changes of a vehicle 105 speed over time, describing changes of longitudinal and lateral acceleration of a vehicle 105 over time, etc.

A control input 210 may be predetermined and stored in a memory of a vehicle computer 110, e.g., in form of a table or array. For example, values in a table of possible control inputs 210, i.e., sets of physical parameters, could be empirically determined for various conditions, e.g., changing lanes on a straight road at a specified speed, braking to a stop on dry pavement starting from a specified speed, just to name two of many possible examples. As another example, a control input 210 may be received as an input (including a table, array, etc.) from, e.g., the remote computer 140, a user input via an HMI in the vehicle 105, etc.

Figure 3:
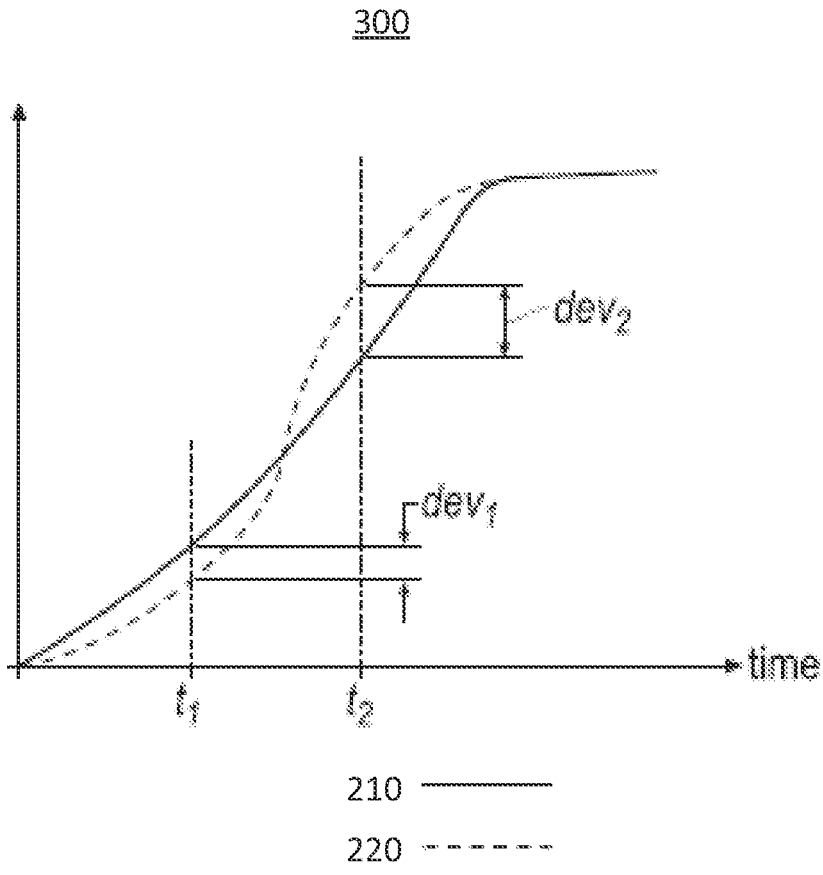
FIG. 3 is a graph of an expected control input and a response of the cascade controller with initial calibration parameters.

An expected control input 210 may include a plurality of operation points. A number of operation points included in a control input 210 may be based on a duration of the control input 210, e.g., 3 seconds, and a sampling rate, e.g., 100 milliseconds (ms). An "operation point" specifies a value of one or more physical parameter(s) at a specific time. The specific time of each operation point refers to an associated sampling point, i.e., a time at which the value is defined or captured. In one example, each operation point of an expected control input 210 may specify changes of respective physical parameters at a given time. FIG. 3 shows a graph 300 including an example expected control input 210. Values of expected control input 210 at times $t_1$, $t_2$ represent two example operation points of the expected control input 210. For example, the Y-axis of the graph may illustrate an expected location, speed, acceleration, etc. of the vehicle 105.

A plurality of "actual" operation points describing physical parameters that occur in response to actuation of a vehicle component 125 is referred to as a response 220. In this document, the term "actual" is used in contrast with "expected." An expected operation point specifies what was expected (i.e., planned or desired) at a specific time, whereas the "actual" operation point specifies what was achieved at the specific time by actuating, e.g., the vehicle component(s) 125 based on the expected operation points and control strategies. The response 220 may include changes of a physical parameter based at least in part on an actuation of a vehicle component 125 by the cascade controller 200.

Respective calibration parameters for the controllers 205 of the cascade controller 200 (i.e., collectively referred to herein as calibration parameters for the cascade controller 200) allow the cascade controller 200 to follow an expected control input 210, i.e., resulting in a response 220 that follows the expected control input 210. In a theoretical ideal situation, "follow" means that the response 220 of the cascade controller 200 is identical to the expected control input 210. However, in reality, for various reasons such as an inaccurate calibration parameter, the response 220 of the cascade controller 200 may deviate from the expected control input 210. An inaccurate calibration parameter is one where the respective parameter is not adjusted (or calibrated) such that the response 220 follows the expected control input 210.

The graph 300 of FIG. 3 shows an example response 220 to the example expected control input 210. A difference between the response 220 and the expected control input 210 is in the present context referred to as a "deviation." For example, FIG. 3 shows deviations $dev_1$, $dev_2$ of the response 220 from the expected control input 210 at the times $t_1$, $t_2$. A deviation may be caused either when the response 220 exceeds the expected control input 210 which may be referred to as an "overshoot", or when the response 220 goes below the expected control input 210, which may be referred to as an "undershoot." As discussed above, an expected control input 210 includes a plurality of operation points. Thus, the expected control input 210 may include a first set of expected operation points and the response 220 may include a second set of response 220 operation points. The deviation may include a plurality of deviations between each of the respective operation points of the first and second set. In other words, a deviation of a control input 210 includes a difference between respective values of the physical parameters of expected versus actual operation points at a given point in time. A deviation may be specified as a percentage determined by dividing a deviation value by an expected value at an operation point.

The vehicle computer 110 can determine whether a cascade controller 200 is accurately calibrated based on the deviation. For example, the vehicle computer 110 can compare the deviation to a deviation threshold. A cascade controller 200 may be considered to be inaccurately calibrated when a deviation of the response 220 exceeds the deviation threshold. A cascade controller 200 may be considered to be accurately calibrated when a deviation of the response 220 does not exceed the deviation threshold. The deviation threshold may include a maximum overshoot threshold, a maximum undershoot threshold, and an average threshold of deviations. For example, a maximum overshoot threshold may be 110% (i.e., 10% above control input value), a maximum undershoot threshold may be 95% (i.e., 5% below control input value), and an average deviation threshold may be +/−3% (i.e., an average response value is expected to be between 97% to 103% of control input value). The deviation threshold may be determined, e.g., based on empirical testing that allows for determining deviations that indicate undesired vehicle 105 operation, e.g., based on the vehicle component 125, environment conditions, etc. The deviation threshold may be stored, e.g., in respective memories of the remote computer 140 and the vehicle computer 110.

The vehicle computer 110 can be programmed to update calibration parameters for the cascade controller 200, e.g., periodically, when instructed by the remote computer 140, upon determining the cascade controller 200 is inaccurately calibrated, etc. The respective calibration parameters for the primary controller 205a and the secondary controller 205b can be stored, e.g., in respective memories of the controllers 205. The vehicle computer 110 can transmit respective requests, e.g., via the vehicle network, to the controllers 205 to provide the respective calibration parameters. Upon receiving the respective calibration parameters from the respective controllers 205, e.g., via the vehicle network, the vehicle computer 110 can provide the calibration parameters for the cascade controller 200 to the remote computer 140. For example, the vehicle computer 110 can transmit the calibration parameters for the cascade controller 200 to the remote computer 140, e.g., via the network 135.

The vehicle computer 110 can receive updated calibration parameters for the cascade controller 200 from the remote computer 140. For example, the vehicle computer 110 can be programmed to monitor the network 135 to detect the updated calibration parameters for the cascade controller 200. Upon receiving the updated calibration parameters for the cascade controller 200, the vehicle computer 110 can provide, e.g., via the vehicle network, the updated calibration parameters for the cascade controller 200 to the primary and secondary controllers 205a, 205b of the cascade controller 200. That is, the vehicle computer 110 can provide, to the respective controllers 205, respective messages specifying the updated calibration parameters for the respective controllers 205. Upon receiving the respective updated calibration parameters, the primary and secondary controllers 205a, 205b may be programmed to overwrite the stored calibration parameters with the received updated calibration parameters.

The updated calibration parameters for respective controllers 205 may maintain or change the type of the corresponding controller 205. That is, a type of a controller 205 can change based on updated calibration parameters, e.g., received from the remote computer 140. For example, calibration parameters for a controller 205 can be updated from zero to a non-zero value or from a non-zero value to zero. As one non-limiting example, the primary controller 205*a* may remain, e.g., a PID controller. As another example, the secondary controller 205*b* may change, e.g., from a P controller to a PD controller.

Figure 4:
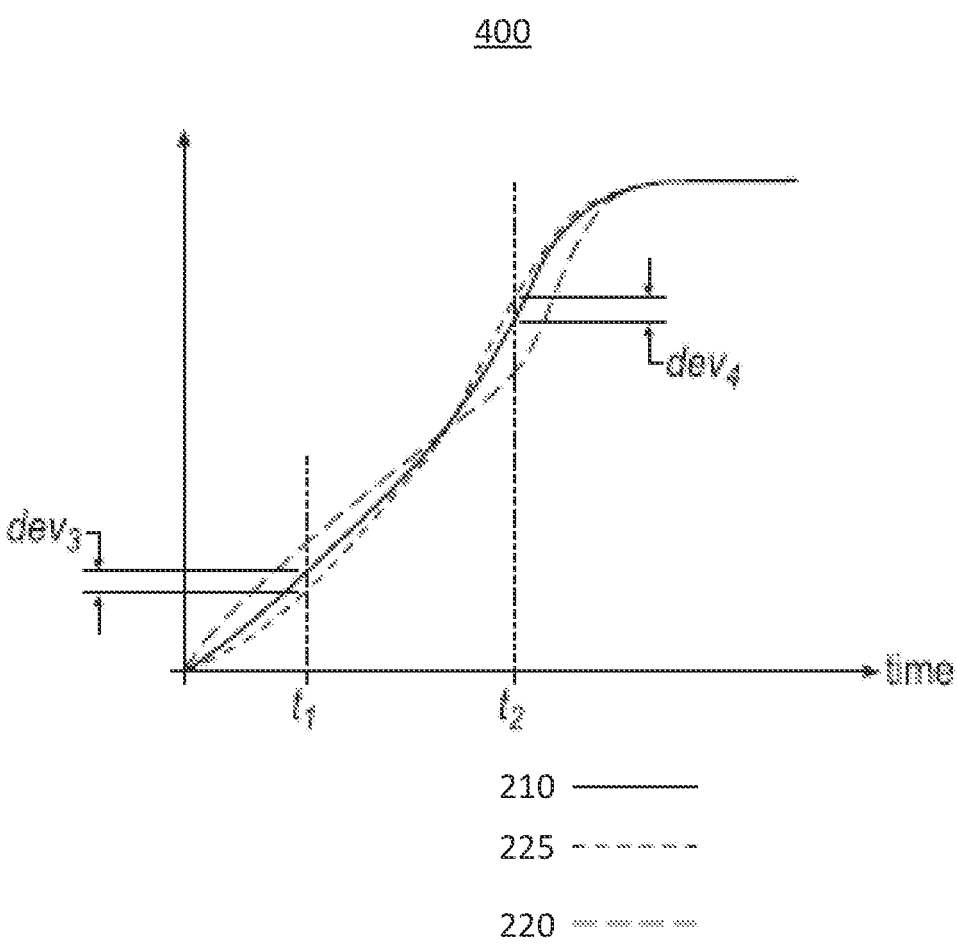
FIG. 4 is graph showing the control input and a response of the cascade controller with the updated calibration parameters.

FIG. 4 shows a graph 400 including the expected control input 210, the response 220 output from the cascade controller 200 having the initial calibration parameters, and an updated response 225 output from the cascade controller having the updated calibration parameters. The updated calibration parameters for the cascade controller 200 may reduce, e.g., minimize, the deviation between the updated response 225 and the expected control input 210. For example, FIG. 4 shows deviations $dev_3$, $dev_4$ of the updated response 225 from the expected control input 210. As a result of updating the calibration parameters for the cascade controller 200, the deviation $dev_3$ and/or the deviation $dev_4$ at the times $t_1$, $t_2$ may be less than the deviations $dev_1$, $dev_2$ of the response 220 from the expected control input 210.

Figure 5:
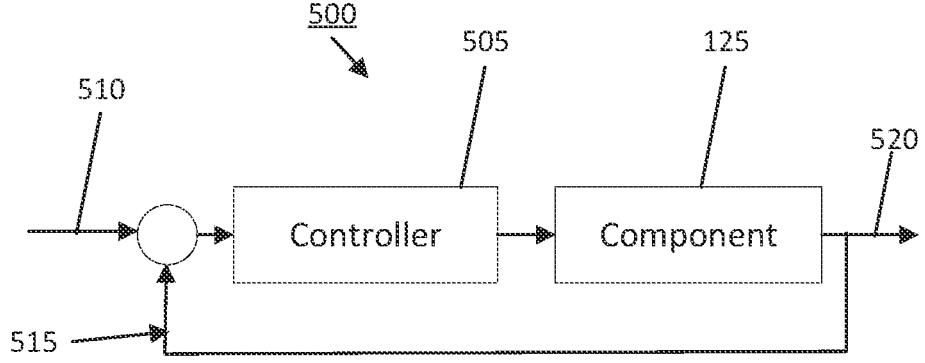
FIG. 5 is a block diagram of an example single-loop controller.

Turning now to FIG. 5, the remote computer 140 is programmed to determine the updated calibration parameters for the cascade controller 200 based on calibration parameters for a single-loop controller 500. A single-loop controller 500 includes one controller 505 configured to receive an expected control input 510 and to output a response 520. The controller 505 is a computing device that has features in common with the controller 205 and therefore will not be described further to avoid redundancy. The expected control input 510 and the response 520 for the single-loop controller 500 have features in common with the expected control input 210 and the response 220, respectively, for the cascade controller 200 and therefore will not be described further to avoid redundancy.

The single-loop controller 500 includes one feedback loop 515 to provide feedback to the one controller 505, e.g., to adjust the response 520 of the controller 505, which allows the single-loop controller 500 to minimize a difference between the expected control input 510 and the response 520, i.e., a deviation for the single-loop controller 500. The one controller 505, in the context of this disclosure, is programmed according to a proportional-integral-derivative-double integral-double derivative (PIDI2D2) control strategy. The PIDI2D2 control strategy includes proportional (P), integral (I), derivative (D), double integral (I2), and double derivative (D2) calibration parameters. The one controller 505 can have any suitable type, e.g., a PIDI2D2 controller, a PIDD2 controller, a PIDI2 controller, a PID controller, a PDD2 controller, etc.

The remote computer 140 may determine updated parameters for the cascade controller 200, e.g., periodically, when a received response 220 indicates that the cascade controller 200 is inaccurately calibrated, etc. To determine the updated calibration parameters for the cascade controller 200, the remote computer 140 can select a type of the single-loop controller 500. For example, the remote computer 140 can select the type of the single-loop controller 500 based on the type of the cascade controller 200, i.e., the calibration parameters for the cascade controller 200. For example, the remote computer 140 can convert the calibration parameters for the cascade controller 200 to calibration parameters for a single-loop controller 500 according to equation:

$$k_i = \begin{bmatrix} P_1 \\ I_1 \\ D_1 + 1 \end{bmatrix}^T A_i \begin{bmatrix} P_2 \\ I_2 \\ D_2 \end{bmatrix} \tag{2}$$

where $k_i$ is a calibration parameter for the single-loop controller 500, $P_1$, $I_1$, $D_1$, $P_2$, $I_2$, and $D_2$ are the respective calibration parameters for the primary and secondary controllers 205*a*, 205*b*, *i* is one of P, I, D, I2, D2, and $A_i$ is one of the following matrices:

$$A_P = \begin{bmatrix} 1 & 0 & 0 \\ 0 & 0 & 1 \\ 0 & 1 & 0 \end{bmatrix}; A_I = \begin{bmatrix} 0 & 1 & 0 \\ 1 & 0 & 0 \\ 0 & 0 & 0 \end{bmatrix}; A_D = \begin{bmatrix} 0 & 0 & 1 \\ 0 & 0 & 0 \\ 1 & 0 & 0 \end{bmatrix};$$

$$A_{I2} = \begin{bmatrix} 0 & 0 & 0 \\ 0 & 1 & 0 \\ 0 & 0 & 0 \end{bmatrix}; A_{D2} = \begin{bmatrix} 0 & 0 & 0 \\ 0 & 0 & 0 \\ 0 & 0 & 1 \end{bmatrix}$$

As another example, the remote computer 140 can select the type of the single-loop controller 500 based on a user input to the HMI 145 specifying the type of single-loop controller 500. As yet another example, a predetermined type of single-loop controller 500 may be stored, e.g., in a memory of the remote computer 140.

Upon selecting the type of single-loop controller 500, the remote computer 140 can determine calibration parameters for the single-loop controller 500, e.g., that minimize the deviation between a response 520 and an expected control input 510 for the single-loop controller 500. As one example, the remote computer 140 can determine the calibration parameters for the single-loop controller 500 based on simulation data. For example, the remote computer 140 can input the single-loop controller 500 into a vehicle dynamics model. The "vehicle dynamics model" is a kinematic model describing vehicle 105 motion that outputs performance data for a virtual component 125 actuated by the single-loop controller 500 in response to an expected control input 510. The vehicle dynamics model can model and output performance of the virtual component 125 according to the calibration parameters for the single-loop controller 500. By inputting the single-loop controller 500 to the vehicle dynamics model, the remote computer 140 can collect data about performance of the virtual component 125 actuated by the single-loop controller 500. That is, the remote computer 140 can test the operation of the virtual component 125 with a plurality of different calibration parameters for the single-loop controller 500. The remote computer 140 can then select the calibration parameters that minimize the deviation, i.e., the difference between the expected control input 510 and the response 520, for the single-loop controller 500.

As another example, the remote computer 140 can determine the calibration parameters for the single-loop controller 500 based on a user input via the HMI 145. For example, the remote computer 140 may actuate the HMI 145 to detect a user input specifying the updated calibration parameters for the single-loop controller 500. For example, the HMI 145 may be programmed to display a virtual button on a touchscreen display that the user can select to specify the updated calibration parameters for the single-loop controller 500. In this situation, the HMI 145 may activate sensors that can detect the user selecting the virtual button to specifying the updated calibration parameters for the single-loop controller 500. Upon detecting the user input, the HMI 145 can then provide the user input to the remote computer 140, and the remote computer 140 can determine the calibration parameters for the single-loop controller 500 based on the user input.

In this situation, the remote computer 140 can be programmed to provide an expected control input 510 to the single-loop controller 500. The single-loop controller 500 can be programmed to actuate a corresponding virtual vehicle component 125, e.g., in the vehicle dynamics model, to achieve the expected control input 510. The remote computer 140 can determine a response 520 resulting from the expected control input 510, e.g., based on the vehicle dynamics model. The remote computer 140 can then output, e.g., display via the HMI 145, the response 520.

Upon determining the calibration parameters for the single-loop controller 500, e.g., that minimize the deviation for the single loop controller 500, the remote computer 140 determines updated calibration parameters for the cascade controller 200 based on the determined calibration parameters for the single-loop controller 500, as discussed below. The remote computer 140 can then provide the updated calibration parameters for the cascade controller 200 to the vehicle computer 110. For example, the remote computer 140 can transmit the updated calibration parameters for the cascade controller 200 to the vehicle computer 110, e.g., via the network 135.

As set forth above, Equation 2 can be used to determine particular calibration parameters for a single-loop controller 500 based on particular calibration parameters for a cascade controller 200. However, using Equation 2 can result in a potentially unlimited number of calibration parameters for a cascade controller 200 based on particular calibration parameters for a single-loop controller 500. A conversion algorithm (described below regarding Equations 3-15) determines a relationship between a type of single-loop controller 500 and a type of cascade controller 200. That is, using the conversion algorithm, the remote computer 140 determines particular calibration parameters for the cascade controller 200 based on particular calibration parameters for the single-loop controller 500.

To determine the updated calibration parameters for the cascade controller 200, the remote computer 140 can use Equation 2 to generate a system of bilinear equations according to equation:

$$g_n = y^T A_n x, n=1, \ldots, 5 \tag{3}$$

where $$y = \begin{bmatrix} P_1 \\ I_1 \\ D_1 + 1 \end{bmatrix}; x = \begin{bmatrix} P_2 \\ I_2 \\ D_2 \end{bmatrix}; A_1 = A_P; A_2 = A_I; A_3 = A_D; A_4 = A_{I2}; A_5 = A_{D2}$$

Equation 3 is solvable if and only if the equation:

$$g = \mathcal{A}^T \text{vec} K \tag{4}$$

has rank one solution, i.e., rank (K)=1, where vec stacks the columns of a matrix from left to right; and $$\mathcal{A} = [\mathcal{A}_1 \mathcal{A}_2 \ . \ . \ . \ \mathcal{A}_s]; \quad \mathcal{A}_n = \text{vec}(A_i); \quad K = yx^T; \text{ and}$$
$$g = [k_p k_I k_D k_{I2} K_{D2}]^T$$

Equation 3 is an incomplete system, which can be solved by adding equation:

$$z_n = y^T C_n x, n=1, \ldots, 4 \tag{5}$$

where $z_n$ is a variable to be solved for to complete the system of bilinear equations, and $C_n$ is one of the following matrices:

$$C_1 = \begin{bmatrix} 1 & 0 & 0 \\ 0 & 0 & 0 \\ 0 & 0 & 0 \end{bmatrix}; C_2 = \begin{bmatrix} 0 & 1 & 0 \\ 0 & 0 & 0 \\ 0 & 0 & 0 \end{bmatrix}; C_3 = \begin{bmatrix} 0 & 0 & 1 \\ 0 & 0 & 0 \\ 0 & 0 & 0 \end{bmatrix}; C_4 = \begin{bmatrix} 0 & 0 & 0 \\ 0 & 0 & 1 \\ 0 & 0 & 0 \end{bmatrix}$$

Adding equations 4 and 5 results in the equation:

$$\begin{bmatrix} g_1 \\ g_2 \\ g_3 \\ g_4 \\ g_5 \\ z_1 \\ z_2 \\ z_3 \\ z_4 \end{bmatrix} = \begin{bmatrix} 1 & 0 & 0 & 0 & 0 & 1 & 0 & 1 & 0 \\ 0 & 1 & 0 & 1 & 0 & 0 & 0 & 0 & 0 \\ 0 & 0 & 1 & 0 & 0 & 0 & 1 & 0 & 0 \\ 0 & 0 & 0 & 1 & 0 & 0 & 0 & 0 & 0 \\ 0 & 0 & 0 & 0 & 0 & 0 & 0 & 0 & 1 \\ 1 & 0 & 0 & 0 & 0 & 0 & 0 & 0 & 0 \\ 0 & 1 & 0 & 0 & 0 & 0 & 0 & 0 & 0 \\ 0 & 0 & 1 & 0 & 0 & 0 & 0 & 0 & 0 \\ 0 & 0 & 0 & 0 & 0 & 1 & 0 & 0 & 0 \end{bmatrix} \begin{bmatrix} y_1 x_1 \\ y_2 x_1 \\ y_3 x_1 \\ y_1 x_2 \\ y_2 x_2 \\ y_3 x_2 \\ y_1 x_3 \\ y_2 x_3 \\ y_3 x_3 \end{bmatrix} \tag{6}$$

Solving equation 6 results in:

$$K = yx^T = \begin{bmatrix} z_1 & g_2 - z_2 & g_3 - z_3 \\ z_2 & g_4 & g_1 - z_1 - z_4 \\ z_3 & z_4 & g_5 \end{bmatrix} \tag{7}$$

To solve equation 3, $z_n$ must satisfy rank (K)=1. Using Equation 7, $z_n$ can be determined based on the type of the single-loop controller 500. For example, when the type of single-loop controller 500 is a proportional-integral-derivative-double derivative (PIDD2) controller, $z_n$ can be determined according to one of the following equations:

$$\begin{cases} z_3^3 - g_3 z_3^2 + g_1 g_5 z_3 - g_2 g_5^2 = 0 \\ z_1 = -\dfrac{g_2 g_5}{z_3} \\ z_2 = g_2 \\ z_4 = 0 \end{cases} \tag{8}$$

$$\begin{cases} z_3^3 - 2g_3 z_3^2 + (g_3^2 + g_1 g_5) z_3 + g_2 g_5^2 - g_1 g_3 g_5 = 0 \\ z_4 = -\dfrac{z_3(g_3 - z_3)}{g_5} + g_1 \\ z_1 = g_1 - z_4 \\ z_2 = 0 \end{cases} \tag{9}$$

Equations 8 and 9 correspond to different types of cascade controllers 200. Equation 8 can, for example, be used to determine calibration parameters for a PID primary controller 205a and a PD secondary controller 205b. As another example, Equation 8 can be used to determine calibration parameters for a PI primary controller 205a and a PD secondary controller 205b. Equation 9 can, for example, be used to determine calibration parameters for a PD primary controller 205a and a PID secondary controller 205b. As another example, Equation 9 can be used to determine calibration parameters for a P primary controller 205a and a PID secondary controller 205b.

As another example, when the type of single-loop controller 500 is a proportional-integral-derivative-double integral (PIDI2) controller, $z_n$ can be determined according to the equation:

$$\begin{cases} z_2^3 - g_2 z_2^2 + g_1 g_4 z_2 - g_3 g_4^2 = 0 \\ z_4 = -\dfrac{z_2(g_2 - z_2)}{g_4} + g_1 \\ z_1 = g_1 - z_4 \\ z_3 = g_3 \end{cases} \tag{10}$$

Equation 10 can, for example, be used to determine calibration parameters for a PID primary controller 205a and a PI secondary controller 205b. As another example, Equation 10 can be used to determine calibration parameters for a PI primary controller 205*a* and a PI secondary controller 205*b*.

As another example, when the type of single-loop controller 500 is a proportional-integral-derivative (PID) controller, $z_n$ can be determined according to one of the following equations:

$$
\begin{cases}
z_1 = g_1 \\
z_2 = g_2 \\
z_3 = g_3 \\
z_4 = 0
\end{cases} \tag{11}
$$

$$
\begin{cases}
z_1 = \dfrac{g_2 g_3}{g_1} \\
z_2 = 0 \\
z_3 = g_3 \\
z_4 = g_1
\end{cases} \tag{12}
$$

Equations 11 and 12 correspond to different types of cascade controllers 200. Equation 11 can, for example, be used to determine calibration parameters for a PID primary controller 205*a* and a P secondary controller 205*b*. As another example, Equation 11 can be used to determine calibration parameters for a PI primary controller 205*a* and a P secondary controller 205*b*. Equation 12 can, for example, be used to determine calibration parameters for a PD primary controller 205*a* and a PI secondary controller 205*b*. As another example, Equation 12 can be used to determine calibration parameters for a P primary controller 205*a* and a PI secondary controller 205*b*.

As another example, when the type of single-loop controller 500 is a proportional-derivative-double derivative (PDD2) controller, $z_n$ can be determined according to the equation:

$$
\begin{cases}
z_1 = g_1 \\
z_2 = 0 \\
z_3^2 - g_3 z_3 + g_1 g_5 = 0 \\
z_4 = 0
\end{cases} \tag{13}
$$

Equation 13 can, for example, be used to determine calibration parameters for a PD primary controller 205*a* and a PD secondary controller 205*b*. As another example, Equation 13 can be used to determine calibration parameters for a P primary controller 205*a* and a PD secondary controller 205*b*.

As another example, when the type of single-loop controller 500 is a proportional-integral-derivative-double integral-double derivative (PIDI2D2) controller, $z_n$ can be determined according to the equation:

$$
z^T Q_k z + q_k^T z + c_k = 0, \ k = 1, 2, 3, 4 \tag{14}
$$

where:

$z = [z_1 \ z_2 \ z_3 \ z_4]^T;$ $Q_k$ is a coefficient of a quadratic term and is one of the following matrices:

$$
Q_1 = \begin{bmatrix} 0 & 0 & 0 & 0 \\ 0 & 0 & 0 & 0 \\ 0 & 0 & 1 & 0 \\ 0 & 0 & 0 & 0 \end{bmatrix}; Q_2 = \begin{bmatrix} 0 & 0 & 0 & 0 \\ 0 & 0 & 0 & 0 \\ 0 & 0 & 0 & \frac{1}{2} \\ 0 & 0 & \frac{1}{2} & 0 \end{bmatrix};
$$

$$
Q_3 = \begin{bmatrix} 0 & 0 & \frac{1}{2} & 0 \\ 0 & 0 & 0 & 0 \\ \frac{1}{2} & 0 & 0 & \frac{1}{2} \\ 0 & 0 & \frac{1}{2} & 0 \end{bmatrix}, \text{ and } Q_4 = \begin{bmatrix} 0 & 0 & 0 & \frac{1}{2} \\ 0 & 0 & 0 & 0 \\ 0 & 0 & 0 & 0 \\ \frac{1}{2} & 0 & 0 & 1 \end{bmatrix};
$$

$q_k$ is a coefficient of a linear term and is one of the following matrices:

$$
q_1 = \begin{bmatrix} g_5 \\ 0 \\ -g_3 \\ 0 \end{bmatrix}; q_2 = \begin{bmatrix} 0 \\ -g_5 \\ 0 \\ -g_3 \end{bmatrix}; q_3 = \begin{bmatrix} 0 \\ g_5 \\ -g_1 \\ 0 \end{bmatrix}, \text{ and } q_4 = \begin{bmatrix} 0 \\ 0 \\ 0 \\ -g_1 \end{bmatrix};
$$

and $c_k$ is a constant and is one of the following:

$c_1 = 0$, $c_2 = g_2 g_5$, $c_3 = 0$, and $c_4 = 9495$

The remote computer 140 can employ known optimization techniques to determine $z_n$ to satisfy Equation 14, e.g., employing nonlinear least-squares according to the equation:

$$
\min_z \sum_{k=1}^{4} G_k^2(z), \text{ subject to } z \geq 0 \tag{15}
$$

where $G_k(z)$ is Equation 14. Equation 14 may include multiple global minima. However, the remote computer 140 may identify a local minima by using optimization techniques, e.g., according to Equation 15. To improve the likelihood that the remote computer 140 identifies global minima using optimization techniques, solutions for Equations 8-10 may be used as initial inputs for the optimization technique. Equation 14 can, for example, be used to determine calibration parameters for a PID primary controller 205*a* and a PID secondary controller 205*b*. As another example, Equation 14 can be used to determine calibration parameters for a PI primary controller 205*a* and a PID secondary controller 205*b*.

After determining $z_n$ based on the type of single-loop controller 500, i.e., according to one of Equations 8-14, the remote computer 140 can determine a particular set of y and x according to the equation:

$$
\begin{cases}
y = [z_1 \ z_2 \ z_3]^T \\
x = \left[ 1 \ \dfrac{g_2 - z_2}{z_1} \ \dfrac{g_3 - z_3}{z_1} \right]^T
\end{cases} \tag{16}
$$

Using the relationship identified above for Equation 3, the remote computer 140 can determine the calibration parameters for the primary controller 205*a* according to:

$$y = \begin{bmatrix} P_1 \\ I_1 \\ D_1 + 1 \end{bmatrix} = \begin{bmatrix} z_1 \\ z_2 \\ z_3 \end{bmatrix}$$

and the remote computer 140 can determine the calibration parameters for the secondary controller 205b according to:

$$x = \begin{bmatrix} P_2 \\ I_2 \\ D_2 \end{bmatrix} = \begin{bmatrix} 1 \\ \dfrac{g_2 - z_2}{z_1} \\ \dfrac{g_3 - z_3}{z_1} \end{bmatrix}$$

Additionally, the remote computer 140 can determine alternative calibration parameters for the cascade controller 200 by scaling the particular set of y and x. Specifically, the remote computer 140 can multiply y by a scaling factor $\alpha$ and can divide x by the scaling factor $\alpha$. The remote computer 140 can determine the scaling factor $\alpha$ based on, e.g., a user input via the HMI 145 specifying the scaling factor $\alpha$, simulation data, etc.

Techniques described herein determine a relationship between calibration parameters for a type of cascade controller 200 and calibration parameters for a type of single-loop controller 500. This means that, for particular calibration parameters for the single-loop controller 500, particular calibration parameters for a cascade controller 200 can be determined. This can provide a reduction in an amount of time and computational resources required to adjust calibration parameters for a cascade controller 200, e.g., to minimize the deviation between an expected control input 210 and a response 220 for the cascade controller 200.

Figure 6:
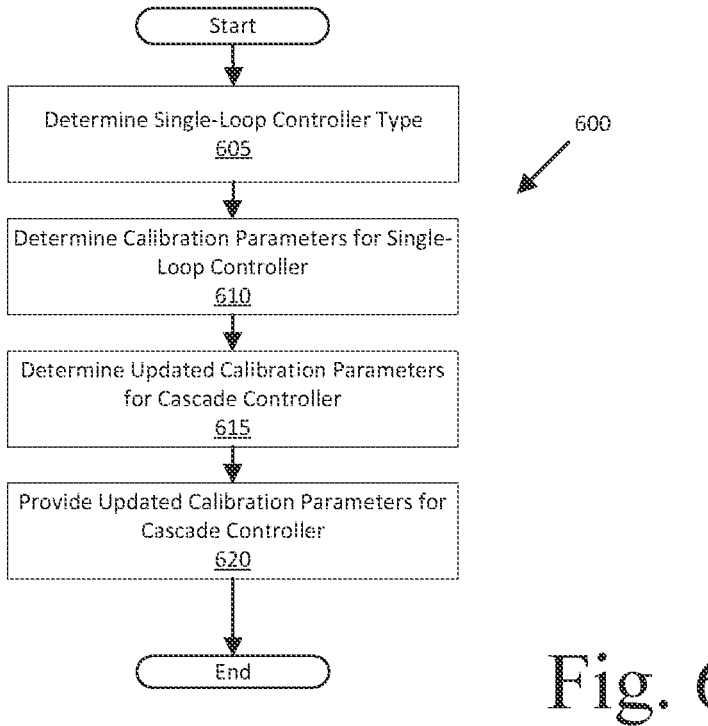
FIG. 6 is a flowchart of an exemplary process for determining updated calibration parameters for the cascade controller in a remote computer.

FIG. 6 is a diagram of an example process 600 executed in a remote computer 140 according to program instructions stored in a memory thereof for determining calibration parameters for a cascade controller 200 based on calibration parameters for a single-loop controller 500. Process 600 includes multiple blocks that can be executed in the illustrated order. Process 600 could alternatively or additionally include fewer blocks or can include the blocks executed in different orders.

Process 600 begins in a block 605. In the block 605, the remote computer 140 determines a type of single-loop controller 500, e.g., by converting calibration parameters for the cascade controller 200 using Equation 2, based on a user input via an HMI 145 specifying the type of single-loop controller 500, etc., as discussed above. The process 600 continues in a block 610.

In the block 610, the remote computer 140 determines calibration parameters for the single-loop controller 500. The remote computer 140 can determine the calibration parameters for the single-loop controller 500 such that the calibration parameters minimize a deviation between the expected control input 510 and a response 520 of the single-loop controller 500, e.g., based on simulation data and/or a user input, as discussed above. The process 600 continues in a block 615.

In the block 615, the remote computer 140 determines updated calibration parameters for the cascade controller 200 according to the conversion algorithm discussed above in relation to Equations 3-15. The remote computer 140 can determine calibration parameters for a type of cascade controllers 200 based on the type of single-loop controller 500, as discussed above. The process 600 continues in a block 620.

In the block 620, the remote computer 140 provides the updated calibration parameters for the cascade controller 200 to a vehicle computer 110, as discussed above. The calibration parameters for the cascade controller 200 typically are then used by the vehicle computer 110 to actuate a vehicle component 125 to achieve an expected control input 210, as discussed above. The process 600 ends following the block 615.

Figure 7:
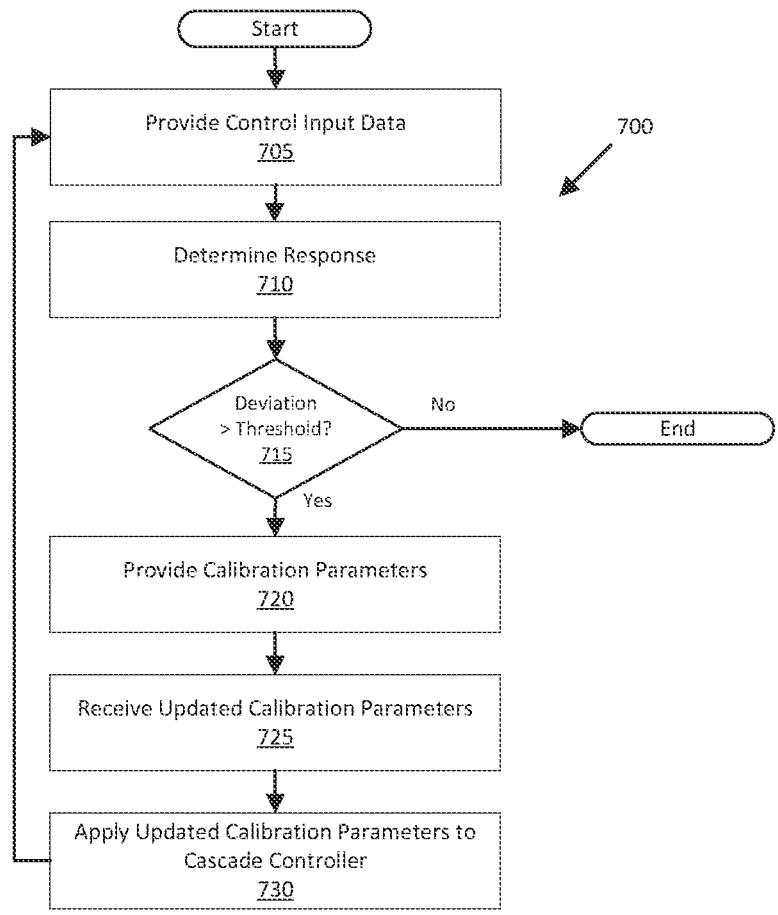
FIG. 7 is a flowchart of an exemplary process for determining updated calibration parameters for the cascade controller in a vehicle computer.

FIG. 7 is a diagram of an example process 700 executed in a vehicle computer 110 according to program instructions stored in a memory thereof for updating calibration parameters for a cascade controller 200. Process 700 includes multiple blocks that can be executed in the illustrated order. Process 700 could alternatively or additionally include fewer blocks or can include the blocks executed in different orders.

Process 700 begins in a block 705. In the block 705, the vehicle computer 110 provides an expected control input 210 to the cascade controller 200. The cascade controller 200 can use the expected control input 210 to actuate a vehicle component 125 to achieve the expected control input 210 based on calibration parameters for the cascade controller 200, as discussed above. The process 700 continues in a block 710.

In the block 710, the vehicle computer 110 determines a response 220 from the cascade controller 200. For example, the vehicle computer 110 can receive the response 220 from the cascade controller 200, e.g., via the vehicle communication network. As another example, the vehicle computer 110 can determine the response 220 based on sensor 115 data for the vehicle component 125. The process 700 continues in a block 715.

In the block 715, the vehicle computer 110 determines whether a deviation between the expected control input 210 and the response 220 exceeds a deviation threshold. If the vehicle computer 110 determines that the deviation exceeds the deviation threshold, then the process 700 continues in a block 720. Otherwise, the process 700 ends.

In the block 720, the vehicle computer 110 provides calibration parameters for the cascade controller 200 to a remote computer 140, as discussed above. The process 700 continues in a block 725.

In the block 725, the vehicle computer 110 receives updated calibration parameters for the cascade controller 200 from the remote computer 140, as discussed above. The remote computer 140 determines the updated calibration parameters for the cascade controller 200 according to process 600. The process 700 continues in a block 730.

In the block 730, the vehicle computer 110 applies the updated calibration parameters to the cascade controller 200. That is, the vehicle computer 110 provides the respective updated calibration parameters to the primary and secondary controllers 205a, 205b. The primary and secondary controllers 205a, 205b then update the respective calibration parameters stored, e.g., in respective memories. The process 700 returns to the block 705.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

In general, the computing systems and/or devices described may employ any of a number of computer operating systems, including, but by no means limited to, versions and/or varieties of the Ford Sync® application, App-Link/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board first computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A system, comprising a computer including a processor and a memory, the memory storing instructions executable by the processor to:

convert calibration parameters for a cascade controller to calibration parameters for a single-loop controller, wherein the cascade controller includes a primary controller and a secondary controller, and respective calibration parameters of the primary controller and the secondary control of the cascade controller are converted to the calibration parameters of the single-loop controller;

determine the calibration parameters for the single loop controller so as to minimize a difference between an input to the single-loop controller and a response from the single-loop controller;

convert the calibration parameters for the single loop control to updated calibration parameters for the cascaded controller;

wherein the updated calibration parameters for the cascade controller are provided to a second computer in a vehicle for vehicle operations; and wherein the second computer can be programmed to update calibration parameters for the cascade controller periodically when instructed by the computer.

2. The system of claim 1, wherein the instructions further include instructions to select a type of one of the single-loop controller or the cascade controller based on a type of the other of the single-loop controller or the cascade controller, wherein the type of the cascade controller is defined by a type of the primary controller and a type of the secondary controller.

3. The system of claim 2, wherein the type of the single-loop controller is a proportional-integral-derivative-double integral-double derivative controller, the type of primary controller is one of a proportional-integral-derivative (PID) controller or a proportional-integral (PI) controller, and the type of the secondary controller is a PID controller.

4. The system of claim 2, wherein the type of the single-loop controller is a proportional-integral-derivative-double derivative controller, the type of the primary controller is one of a PID controller or a PI controller, and the type of the secondary controller is the proportional-derivative (PD) controller.

5. The system of claim 2, wherein the type of the single-loop controller is a proportional-integral-derivative-double derivative controller, the type of the primary controller is one of a PD controller or a proportional (P) controller, and the type of the secondary controller is the PID controller.

6. The system of claim 2, wherein the type of the single-loop controller is a proportional-integral-derivative-double integral controller, the type of the primary controller is one of a PID controller or a PI controller, and the type of the secondary controller is a PI controller.

7. The system of claim 2, wherein the type of the single-loop controller is a PID controller, the type of the primary controller is one of a PID controller or a PI controller, and the type of the secondary controller is a P controller.

8. The system of claim 2, wherein the type of the single-loop controller is a PID controller, the type of the primary controller is one of a PD controller or a P controller, and the type of the secondary controller is a PI controller.

9. The system of claim 2, wherein the type of the single-loop controller is a proportional-derivative-double derivative controller, the type of the primary controller is one of a PD controller or a P controller, and the type of the secondary controller is a PD controller.

10. The system of claim 1, further comprising the second computer including a second processor and a second memory storing instructions such that the second computer is programmed to actuate a vehicle component based on the calibration parameters for the cascade controller.

11. The system of claim 1, wherein the instructions further include instructions to determine the calibration parameters for the single-loop controller based on one of a) a user input specifying the calibration parameters, or b) simulation data.

12. A method, comprising:

converting calibration parameters for a cascade controller to calibration parameters for a single-loop controller, wherein the cascade controller includes a primary controller and a secondary controller, and respective calibration parameters of the primary controller and the secondary control of the cascade controller are converted to the calibration parameters of the single-loop controller;

determining the calibration parameters for a single-loop controller so as to minimize difference between an input to the single-loop controller and a response from the single-loop controller;

converting the determined calibration parameters for the single-loop controller to updated calibration parameters for the cascade controller; and providing the updated calibration parameters for the cascade controller to a second computer in a vehicle;

wherein the second computer can be programmed to update calibration parameters for the cascade controller periodically when instructed by the computer.

13. The method of claim 12, further comprising selecting a type of one of the single-loop controller or the cascade controller based on a type of the other of the single-loop controller or the cascade controller, wherein the type of the cascade controller is defined by a type of the primary controller and a type of the secondary controller.

14. The method of claim 13, wherein the type of the single-loop controller is a proportional-integral-derivative-double integral-double derivative controller, the type of primary controller is one of a proportional-integral-derivative (PID) controller or a proportional-integral (PI) controller, and the type of the secondary controller is a PID controller.

15. The method of claim 13, wherein the type of the single-loop controller is a proportional-integral-derivative-double derivative controller, the type of the primary controller is one of a PID controller or a PI controller, and the type of the secondary controller is the proportional-derivative (PD) controller.

16. The method of claim 13, wherein the type of the single-loop controller is a proportional-integral-derivative-double derivative controller, the type of the primary controller is one of a PD controller or a proportional (P) controller, and the type of the secondary controller is the PID controller.

17. The method of claim 13, wherein the type of the single-loop controller is a proportional-integral-derivative-double integral controller, the type of the primary controller is one of a PID controller or a PI controller, and the type of the secondary controller is a PI controller.

18. The method of claim 13, wherein the type of the single-loop controller is a PID controller, the type of the primary controller is one of a PID controller or a PI controller, and the type of the secondary controller is a P controller.

19. The method of claim 13, wherein the type of the single-loop controller is a PID controller, the type of the primary controller is one of a PD controller or a P controller, and the type of the secondary controller is a PI controller.

20. The system of claim 13, wherein the type of the single-loop controller is a proportional-derivative-double derivative controller, the type of the primary controller is one of a PD controller or a P controller, and the type of the secondary controller is a PD controller.

* * * * *